United States Patent
Lokesh et al.

(10) Patent No.: US 11,368,743 B2
(45) Date of Patent: Jun. 21, 2022

(54) TELESTRATION CAPTURE FOR A DIGITAL VIDEO PRODUCTION SYSTEM

(71) Applicant: SLING MEDIA PVT LTD, Bangaluru (IN)

(72) Inventors: Rahul Lokesh, Bangalore (IN); Adithya Narayana, Bangalore (IN); Abhiroop Boggavarapu, Bangalore (IN); Laxminarayana Dalimba, Bangalore (IN)

(73) Assignee: SLING MEDIA PVT LTD, Bangaluru (IN)

(*) Notice: Subject to any disclaimer, the term of this patent is extended or adjusted under 35 U.S.C. 154(b) by 21 days.

(21) Appl. No.: 16/712,690

(22) Filed: Dec. 12, 2019

(65) Prior Publication Data
US 2021/0185385 A1 Jun. 17, 2021

(51) Int. Cl.
*H04N 21/431* (2011.01)
*H04N 21/485* (2011.01)
(Continued)

(52) U.S. Cl.
CPC ..... *H04N 21/4316* (2013.01); *G06F 3/04883* (2013.01); *G06F 3/04886* (2013.01); *H04N 21/4858* (2013.01)

(58) Field of Classification Search
CPC ........... H04N 21/4316; H04N 21/4858; H04N 5/272; H04N 21/23424; H04N 21/2365;
(Continued)

(56) References Cited

U.S. PATENT DOCUMENTS 6,057,833 A * 5/2000 Heidmann ........... G11B 27/034
345/474
8,677,420 B2 3/2014 Cromarty et al.
(Continued)

FOREIGN PATENT DOCUMENTS

| EP | 1045580 A2 | 10/2000 |
| WO | 2014145925 A1 | 9/2014 |
| WO | 2018071781 A2 | 4/2018 |

OTHER PUBLICATIONS

Q. Zhou and D. Liu, "Interactive visual content sharing and telestration: A novel network multimedia service," 2010 14th International Conference on Intelligence in Next Generation Networks, 2010, pp. 1-6, doi: 10.1109/ICIN.2010.5640915. (Year: 2010).*

*Primary Examiner* — Cynthia M Fogg
(74) *Attorney, Agent, or Firm* — KW Law, LLP

(57) ABSTRACT

Systems, devices and processes and described herein to improve the generation of video content in video production systems. In general, the systems, devices and processes facilitate the incorporation of remotely generated user telestration inputs into output video streams generated by the video production systems. In one embodiment user telestration inputs are received at a control device. Minimum capture shapes corresponding to the user telestration inputs are then determined and images corresponding to the minimum capture shape are captured. The captured images are then transmitted from the control device to the video access point device. At the video access point device the captured images can then be combined with previously captured and transmitted images and overlaid with a selected input video stream. The video input stream with the overlaid image can then be transmitted as an output video stream.

20 Claims, 4 Drawing Sheets

(51) Int. Cl.
*G06F 3/0488* (2013.01)
*G06F 3/04883* (2022.01)
*G06F 3/04886* (2022.01)

(58) Field of Classification Search
CPC .. H04N 5/445; G06F 3/04886; G06F 3/04883
USPC .......................................................... 725/32
See application file for complete search history.

(56) References Cited

U.S. PATENT DOCUMENTS

| | | |
|---|---|---|
| 9,266,017 B1 | 2/2016 | Parker et al. |
| 9,390,169 B2 * | 7/2016 | Mouilleseaux ......... G06F 16/70 |
| 2011/0102678 A1 * | 5/2011 | House ..................... H04N 9/75 |
| | | 348/584 |
| 2011/0107238 A1 | 5/2011 | Liu et al. |
| 2014/0253472 A1 | 9/2014 | Ayoub et al. |
| 2015/0194187 A1 | 7/2015 | Cleven et al. |
| 2015/0248198 A1 * | 9/2015 | Somlai-Fisher ...... G06F 1/1694 |
| | | 715/716 |
| 2015/0248918 A1 | 9/2015 | Tang |
| 2015/0350737 A1 | 12/2015 | Anderson et al. |
| 2016/0182924 A1 | 6/2016 | Todd |
| 2018/0316939 A1 | 11/2018 | Todd |

* cited by examiner

TELESTRATION CAPTURE FOR A DIGITAL VIDEO PRODUCTION SYSTEM

TECHNICAL FIELD

The following discussion generally relates to the production of digital video programming. More particularly, the following discussion relates to the use of telestration in the production of digital video programming.

BACKGROUND

Recent years have seen an explosion in the creation and enjoyment of digital video content. Millions of people around the world now carry mobile phones, cameras or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

More recently, video production systems have been created that allow groups of relatively non-professional users to capture one or more video feeds, to select one of the video feeds for an output stream, and to thereby produce a professional-style video of the output stream for viewing, sharing, publication, archiving and/or other purposes. Many of these systems rely upon Wi-Fi, Bluetooth and/or other wireless communications for sharing of video feeds, control instructions and the like.

However, there remains a continuing desire to create systems and methods that facilitate the incorporation of additional user generated content into the generated video output streams. Other desirable features and characteristics will become apparent from the subsequent detailed description and the appended claims, taken in conjunction with the accompanying drawings and this background section.

BRIEF SUMMARY

Various embodiments provide systems, devices and processes to improve the generation of video content in video production systems. In general, the systems, devices and processes facilitate the incorporation of remotely generated user telestration inputs into output video streams generated by the video production systems. Specifically, in one embodiment user telestration inputs are received at a control device. Minimum capture shapes corresponding to the user telestration inputs are then determined and images corresponding to the minimum capture shape are captured. The captured images are then transmitted from the control device to the video access point device. At the video access point device the captured images can then be combined with previously captured and transmitted images and overlaid with a selected input video stream. The video input stream with the overlaid image can then be transmitted as an output video stream. In such an embodiment the use of the minimum capture shapes to capture and transmit the user telestration inputs can provide several distinct improvements. Specifically, the use of the minimum capture shapes to capture and transmit the user telestration inputs can significant reduce the processing resources and time needed to capture the user telestration input and transmit the captured images to the control device. This can facilitate improved performance, such as increased output video stream frame rates.

A first example embodiment provides an automated process executable by a control device and a video access point device that produces a video output stream that includes user telestration inputs. The automated process suitably comprises: receiving a first user telestration input for a selected input video stream at the control device; determining a first minimum capture shape corresponding to the first user telestration input; capturing at the control device a first image corresponding to the first minimum capture shape, the captured first image including a representation of the user telestration input within the first minimum capture shape; transmitting the captured first image from the control device to the video access point device; overlaying the captured first image with the selected input video stream; and transmitting the selected input video stream with the captured first image from the video access point device as an output video stream for viewing.

A further example may comprise wherein the step of determining the first minimum capture shape corresponding to the first user telestration input comprises determining user telestration input occurring during a first sample cycle.

A further example may comprise wherein the step of overlaying the captured first image with the selected input video stream comprises combing the captured first image with a previously captured image and overlaying the combined image with the selected input video stream.

A further example may comprise wherein the representation of the user telestration input is included in a first image layer, and wherein the captured first image includes image data from the first image layer A further example may comprise wherein the first minimum capture shape is a rectangle.

A further example may comprise wherein the control device comprises a touch screen and wherein the user telestration input is received using the touch screen.

A further example may comprise wherein the step of transmitting the captured first image from the control device to the video access point device is done using a remote procedure call.

A further example may comprise: receiving a second user telestration input for the selected input video stream at the control device; determining a second minimum capture shape corresponding to the second user telestration input; capturing at the control device a second image corresponding to the second minimum capture shape, the captured second image including a representation of the second user telestration input within the second minimum capture shape; transmitting the captured second image from the control device to the video access point device; combining the captured second image and the captured first image to generate a combined image; overlaying the combined image with the selected input video stream; and transmitting the selected input video stream overlaid with the combined image from the video access point device as an output for viewing.

A further example may comprise wherein the step of determining the first minimum capture shape corresponding to the first user telestration input comprises determining user telestration input occurring during a first sample cycle and wherein the of determining the second minimum capture shape corresponding to the second user telestration input comprises determining user telestration input occurring during a second sample cycle following the first sample cycle.

A further example may comprise wherein the control device comprises a processor, memory and display, wherein the processor executes program logic stored in the memory to perform the steps of determining the first minimum capture shape corresponding to the user telestration input and capturing at the control device the first image corresponding to the first minimum capture shape.

A second example embodiment provides a control device comprising a processor and a memory, wherein the processor is configured to perform an automated process by executing digital instructions stored in the memory, wherein the automated process comprises: receiving a first user telestration input for a selected input video stream at the control device; determining a first minimum capture shape corresponding to the first user telestration input; capturing at the control device a first image corresponding to the first minimum capture shape, the captured first image including a representation of the user telestration input within the first minimum capture shape; and transmitting the captured first image from the control device to a video access point device to be overlaid with the selected input video stream.

A further example may comprise wherein the determining the first minimum capture shape corresponding to the first user telestration input comprises determining user telestration input occurring during a first sample cycle.

A further example may comprise wherein the overlaying the captured first image with the selected input video stream comprises combing the captured first image with a previously captured image and overlaying the combined image with the selected input video stream.

A further example may comprise wherein the representation of the user telestration input is included in a first image layer, and wherein the captured first image includes image data from the first image layer.

A further example may comprise wherein the first minimum capture shape is a rectangle.

A further example may comprise wherein the control device comprises a touch screen and wherein the user telestration input is received using the touch screen.

A further example may comprise wherein the transmitting the captured first image from the control device to the video access point device is done using a remote procedure call.

A further example may additionally comprise receiving a second user telestration input for the selected input video stream at the control device; determining a second minimum capture shape corresponding to the second user telestration input; capturing at the control device a second image corresponding to the second minimum capture shape, the captured second image including a representation of the second user telestration input within the second minimum capture shape; and transmitting the second image from the control device to the video access point device to be combined with the transmitted first image and overlaid with the selected input video stream.

A further example may comprise wherein the determining the first minimum capture shape corresponding to the first user telestration input comprises determining user telestration input occurring during a first sample cycle and wherein the of determining the second minimum capture shape corresponding to the second user telestration input comprises determining user telestration input occurring during a second sample cycle following the first sample cycle.

A third example embodiment provides an automated process executable by a control device and a video access point device, where the control device includes a touch screen, a processor and a memory, and where the video access point includes a wireless access point and an encoder, the automated process comprising: transmitting a plurality of input video streams from the access point device to the control device using the wireless access point; displaying a selected input video stream from the plurality of input video streams on the touch screen at the control device; receiving a user telestration input for the selected input video stream on the touch screen at the control device during a sample cycle; displaying a visual representation of the user telestration input on the touch screen; determining a minimum capture rectangle corresponding to the visual representation of the user telestration input during the sample cycle at the control device; capturing at the control device an image layer corresponding to the minimum capture rectangle at the control device, the captured image layer including the visual representation of the user telestration input within the minimum capture rectangle; transmitting the visual representation of the user telestration input within the minimum capture rectangle from the control device to the video access point device; combining the transmitted visual representation of the user telestration input within the minimum capture rectangle with at least one previously transmitted visual representation of a previous user telestration input, the at least one previously transmitted visual representation of a previous user telestration input captured during a previous sample cycle; overlaying the combined visual representations of the user telestration inputs with the selected input video stream at the video access point device; encoding the selected input video stream overlaid with the combined visual representations of the user telestration inputs using the encoder to generate an output video stream; and transmitting the output video stream to a hosting service for viewing using the hosting service.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

Various embodiments provide systems, devices and processes to improve the generation of video content in video production systems. In general, the systems, devices and processes facilitate the incorporation of remotely generated user telestration inputs into output video streams generated by the video production systems.

In one embodiment user telestration inputs are received at a control device. Minimum capture shapes corresponding to the user telestration inputs are then determined and images corresponding to the minimum capture shape are captured. The captured images are then transmitted from the control device to the video access point device. At the video access point device the captured images can then be combined with previously captured and transmitted images and overlaid with a selected input video stream. The video input stream with the overlaid image can then be transmitted as an output video stream.

In such an embodiment the use of the minimum capture shapes to capture and transmit the user telestration inputs can provide several distinct improvements. Specifically, the use of the minimum capture shapes to capture and transmit the user telestration inputs can significant reduce the processing resources and time needed to capture the user telestration input and transmit the captured images to the control device. This can facilitate improved performance, such as increased output video stream frame rates. It should be noted that these various aspects may be modified, omitted and/or enhanced as desired across a wide array of alternate but equivalent embodiments.

The general concepts described herein may be implemented in any video production context, especially the capture and encoding or transcoding of live video. For convenience of illustration, the following discussion often refers to a video production system in which one or more live video streams are received from one or more cameras or other capture devices via a wireless network to produce an output video stream for publication or other sharing. Equivalent embodiments could be implemented within other contexts, settings or applications as desired.

Figure 1:
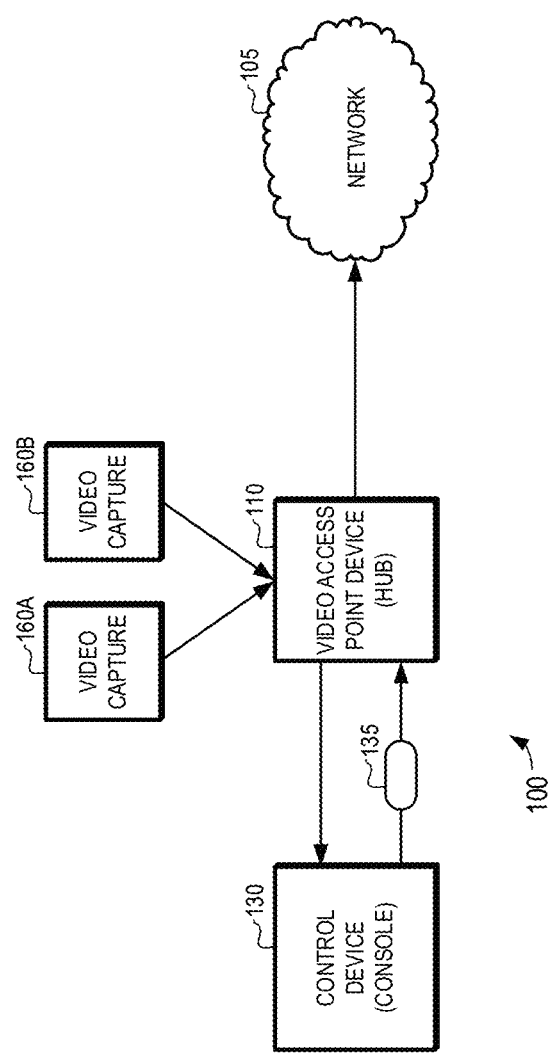
FIG. 1 is a diagram of an example video production system.

Turning now to the drawings and with initial reference to FIG. 1, a video production system 100 suitably includes a video access point device 110 and a control device 130. The video access point device 110 is in communication with video capture devices 160A-B and a network 105.

The video capture devices 160A-B can be any type of camera or other devices capable of generating video content and transmitting that video content in the form a video stream to the video access point device 110. Several examples of such video capture devices 160A-B will be described below. Furthermore, it should be noted that while FIG. 1 illustrates two video capture devices 160A-B that more or fewer video capture devices can be used.

In general, the video access point device 110 is implemented to receive input video streams from the video capture devices 160A-B and selectively process video data from those input video streams to generate an output video stream. For example, the video access point device 110 can be implemented to suitably mix, compress and encode one or more the input video streams into an appropriate format for distribution as an output video stream. To facilitate this, the video access point device 110 can be implemented to include a wide range of video processing, encoding and transmitting capabilities. The output video stream can then be stored (e.g., as a data file on the video access point device 110 or some external storage) and/or transmitted via the network 105. For example, the output video stream can be transmitted via the network 105 to an internet based hosting or distribution service, such as YouTube, Facebook, Ustream, Twitch, Mixer and/or the like.

To provide this functionality the video access point device 110 can be implemented to communicate with video capture devices 160A-B wirelessly (e.g., through a Wi-Fi connection using IEEE 802.11 protocols) or a wired connection (e.g., through Ethernet or High-Definition Multimedia Interface (HDMI)). The video access point 110 also can be implemented to communicate with the network 105 via a wired or wireless connection.

In general, the control device 130 is implemented facilitate user control of the video access point device 110. As such the control device 130 is implemented to receive user inputs and communicate appropriate instructions to the video access point device 110. As will be described in greater detail below, in accordance with the embodiments described herein these user inputs received by the control device 130 can include user telestration inputs.

The control device 130 is implemented to receive one or more video streams received from the video access point device 110, including input video streams originally generated by the video capture devices 160A-B. Furthermore, the control device 130 would include a user interface that is implemented to allow the user to control the operation of the control device 130 and the operation of the video access point device 110. For example, the user interface can include a display device implemented to simultaneously display one or more the video streams received from the video capture devices 160A-B. This user interface can further allow a user to select which of the video streams received from the video capture devices 160A-B are to be encoded into the output video stream by the video access point device 110. And in accordance with the embodiments described herein the user interface is also implemented to facilitate and receive user telestration inputs that will be overlaid with the output video stream.

In one suitable implementation the control device 130 is implemented with an application being executed on a device that includes a touch screen. In such an embodiment the touch screen can be implemented to receive user commands and display one or more of the various video streams received from the video access point device 110. Furthermore, such a touch screen can be implemented to receive user telestration inputs on the same portion of the touch screen used to display video. A detailed example of such an implementation will be described below with reference to FIG. 2. However, it should be noted that such a touch screen implementation is just one example, and other implementations are possible.

The control device 130 can be implemented with any suitable computing device, including laptops, tablets and mobile communication devices (e.g., smart phones). Typically, the control device 130 would be implemented with one or more suitable processors and memory devices to execute a control application for communicating with and controlling the operation of the video access point device 110. The control device 130 can be implemented to communicate with the video access point device 110 using any suitable technique, including wireless (e.g., Wi-Fi) and wired networks. Furthermore, while FIG. 1 shows the control device 130 communicating with the video access point device 110 separately from the video capture devices 160A-B, in practice the same Wi-Fi or other networks could be used if sufficient bandwidth is available. Other embodiments may use any other network configuration desired, including any number of additional or alternate networks or other data links.

In accordance with the embodiments described herein, the control device 130 and video access point device 110 are implemented to facilitate the incorporation of remotely generated user telestration inputs into output video streams generated by the video access point device 110. In such an embodiment the user telestration inputs from a user are received at the control device 130. For example, the user telestration inputs can be received using a touch screen. The control device 130 then determines a minimum capture shape corresponding to the user telestration input, and captures an image 135 of the user telestration input corresponding to the minimum capture shape. The control device 130 then transmits the captured image 135 of the user telestration input to the video access point device 110.

At the video access point device 110 the captured images 135 can then be combined with previously captured images 135 of previous user telestration inputs. The video access point device 110 then overlays the combined images with a selected video stream. The video stream with the overlaid image can then be stored or outputted by the video access point device 110 as an output video stream.

In such an embodiment the use of the minimum capture shapes to capture and transmit the user telestration inputs can provide several distinct improvements. Specifically, the use of the minimum capture shapes to capture and transmit the user telestration inputs can significant reduce the time and processing resources needed to capture the user telestration input at the control device 130. Furthermore, the use of the minimum capture shapes to capture and transmit the user telestration inputs can significant reduce the time and transmission resources needed to transmit the captured images from the control device 130 to the video access point device 110. This can facilitate improved performance, such as increased output video stream frame rates.

In one embodiment, the control device 130 is configured to repeatedly capture and transmit images of the user telestration inputs. For example, the control device 130 can be configured to repeatedly capture and transmit images 135 of the user telestration inputs a determined sample cycle rate. The sample cycle rate used to capture and transmit images can be based on a variety of factors. For example, in one embodiment the sample cycle rate can correspond to the frame rate of the video data being outputted by the video access point device 110 (e.g., 30 or 60 frames per second (fps)). Thus, in this embodiment the control device 130 would capture and transmit an image 135 of user telestration input that occurs during one frame of video.

In one embodiment, the control device 130 is configured to capture an image of the user telestration input corresponding to the minimum capture shape by capturing one or more image layers that contain the user telestration input within the minimum capture shape while not capturing other image layers (e.g., the layers that include underlying video images).

The control device 130 can use a variety of different shapes as the minimum capture shape. In one specific embodiment, the control device 130 generates a rectangle for use as the minimum capture shape. An example of such an embodiment will be discussed in greater detail with reference to FIG. 2.

In one embodiment the control device 130 transmits the image to the video access point device 110 using a remote procedure call. For example, the control device 130 can be configured to transmit the image to the video access point device 110 using Thrift.

Figure 2:
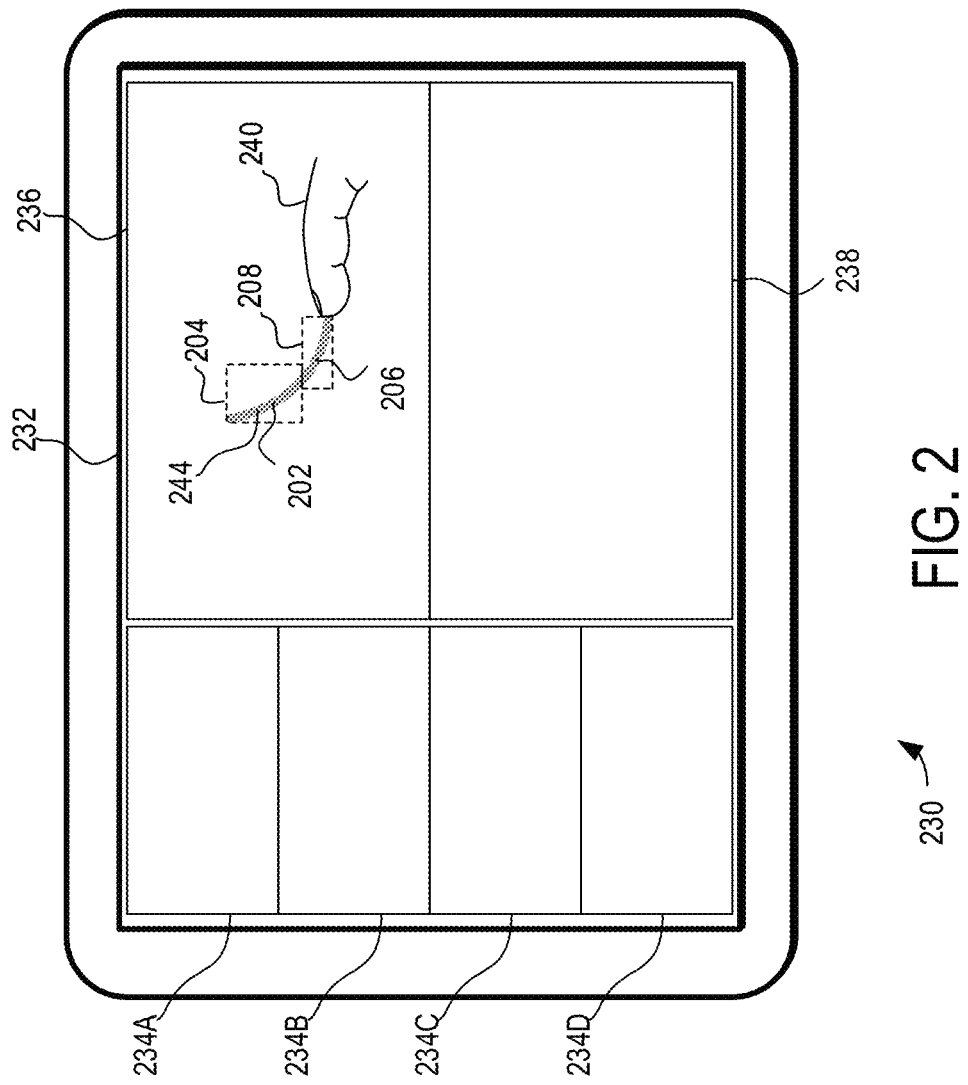
FIG. 2 is a diagram of an example interface of a control device for receiving user telestration inputs.

Turning now to FIG. 2, an exemplary control device 230 is illustrated. Again, the control device 130 is implemented facilitate user control of the video access point device (e.g., video access point device 110). The control device 130 is implemented to receive user inputs and communicate appropriate instructions to the video access point device. Furthermore, the control device 230 is implemented to receive one or more video streams received from the video access point device.

In this illustrated embodiment the control device 230 is implemented with a tablet computer that includes a touch screen 232 implemented to provide a user interface. Specifically, the user interface provided by the touch screen 232 is configured to include four windows 234A-D, where each of the four windows can display an input video stream received from the access point device. The user interface provided by the touch screen 232 is configured to also include a preview window 236 and a program window 238, where the preview window 236 displays currently selected input video stream(s) and the program window output displays the output video stream as encoded by access point device. So configured to touch screen 232 can facilitate user control of the access point device, including the selection of video input streams to be included in the output video stream and a variety of video effects.

And in accordance with the embodiments described herein the touch screen 232 and user interface are implemented to facilitate and receive user telestration inputs that will be overlaid with the output video stream. In this illustrated example the touch screen 232 and user interface are implemented to receive user telestration inputs on the preview window 236 that is used to display the currently selected input video stream(s). However, this is just one example, and other implementations are possible.

FIG. 2 illustrates an example user telestration input being entered with a user's finger 240. Specifically, as the user's finger 240 moves across the surface of the touch screen 232 the touch screen senses the position of the finger 240 and generates an appropriate user telestration input 244, and that user telestration input is displayed on the touch screen 232 in the preview window 236

In accordance with the embodiments described herein, the control device 230 is implemented to facilitate the incorporation of the user telestration input 244 into an output video stream generated by the video access point device. Specifically, the control device 230 determines a minimum capture shape corresponding to the user telestration input, and captures an image of the user telestration input corresponding to the minimum capture shape. The control device 230 then transmits the captured image of the user telestration input to the video access point device.

In this illustrated example a first representation 202 of the user telestration input 244 is generated during a first sample cycle and a second representation 206 of the user telestration input 244 is generated during a second sample cycle. For the first sample cycle the control device 230 determines a first minimum capture shape 204 that corresponds to the first representation 202 of the user telestration input 244. In this illustrated example, the first minimum capture shape 204 is a minimum rectangle, but this is just one example. With the first minimum capture shape 204 determined for the first representation 202 of the user telestration input 244 determined, a first image of the first representation 202 of the user telestration input 244 can be captured and transmitted to the video access point device. At the video access point device the captured first image of the first representation 202 of the user telestration input 244 is overlaid with the output video stream.

For the first sample cycle the control device 230 determines the second minimum capture shape 208 that corresponds to the second representation 206 of the user telestration input 244. With the second minimum capture shape 208 determined for the second representation 206 of the user telestration input 244 determined, a second image of the second representation 206 of the user telestration input 244 can be captured and transmitted to the video access point device. At the video access point device the captured second image is combined with the first image, and the combined image including both the first representation 202 and second representation 206 of the user telestration input 244 is overlaid with the output video stream.

In such an embodiment the use of the minimum capture shapes to capture and transmit the user telestration inputs can provide several distinct improvements. Specifically, the use of the minimum capture shapes 204, 208 to capture and transmit the user telestration inputs can significant reduce the time and processing resources needed to capture the images of the user telestration input 244 at the control device 230. Furthermore, the use of the minimum capture shapes 204, 208 to capture and transmit the user telestration inputs can significant reduce the time and transmission resources needed to transmit the captured images from the control device 230 to the video access point device. This can facilitate improved performance, such as increased output video stream frame rates.

Figure 3:
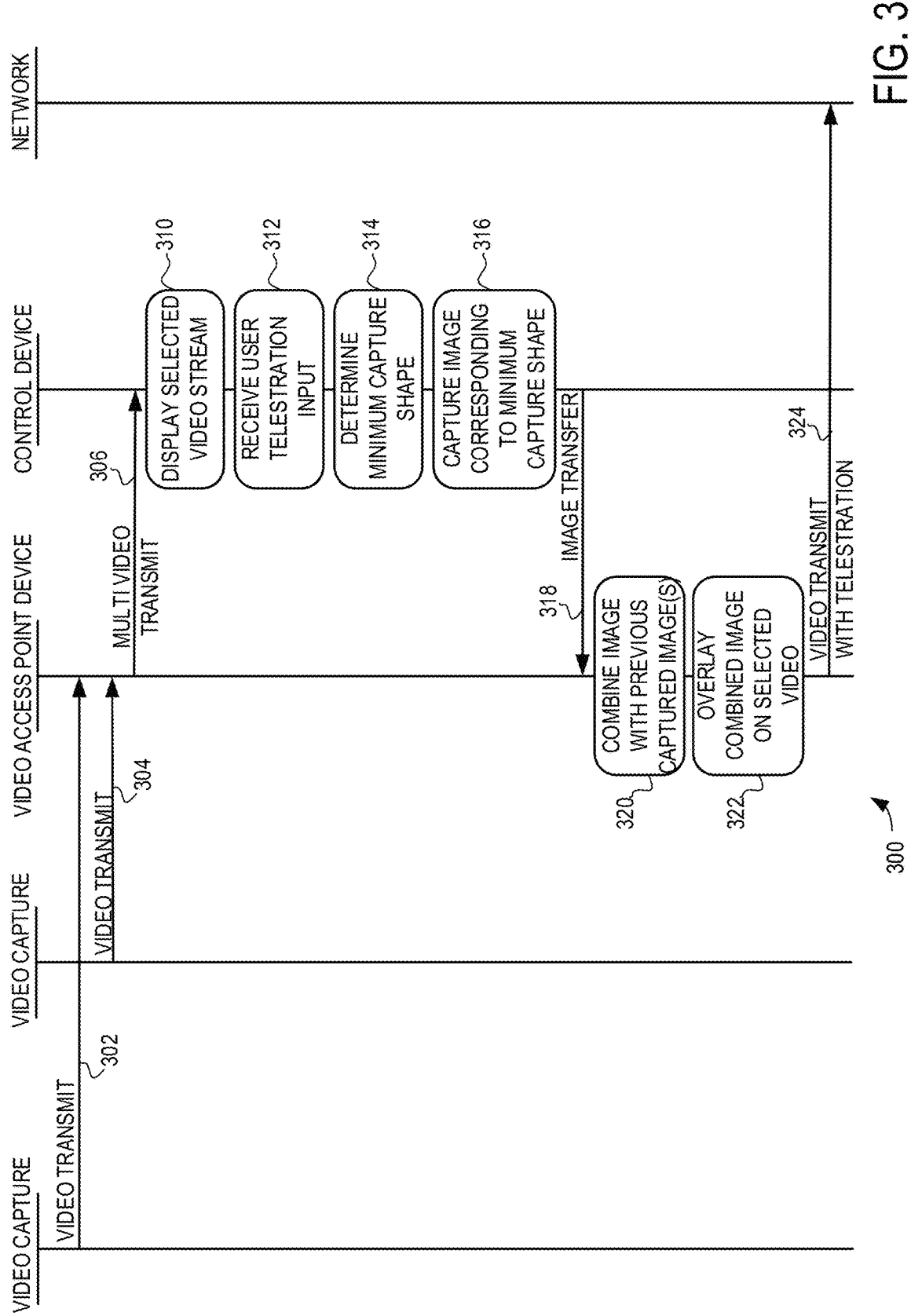
FIG. 3 is a flowchart showing various processes executable by computing devices operating within a video production system.

Turning now to FIG. 3, a process flow diagram 300 illustrates various example processes and data flows that can be automatically executed by video capture devices (e.g., video capture devices 160A-B), video access point devices (e.g., video access point device 110), and control devices (e.g., control devices 130, 230).

Communications between the various devices and networks in process flow 300 can be initiated and established in any suitable manner. For example, communication between the various devices and networks may be established using wireless protocols (e.g., Wi-Fi) or wired systems (e.g., Ethernet or HDMI). It should also be noted that communication between the control device and the video access point device may be established over the same network as communication between video capture devices and the video access point device, or over a separate network, as desired.

With communications established the video capture devices each transmit a video stream to the video access point device using video transmit functions 302 and 304. In general, the video access point device receives and processes these video streams as part of the process to generate an output video stream. For example, the video access point device can be implemented to suitably mix, compress and encode one or more the input video streams into an appropriate format for distribution as an output video stream. To facilitate this, the video access point device transmits the video streams to the control device using multi-video transmit function 306. Then, at process step 310 the control device displays at least one selected video stream. This process step 310 can be performed by displaying one of the input video streams in a preview window (e.g., preview window 236) on the control device.

At process step 312 the control device receives a user telestration input from a user. This process step 312 can be implemented using a touch screen or any other suitable user input device on the control device. In one embodiment a touch screen is implemented to both display the selected video and receive the user telestration input on a preview window (e.g. preview window 236). In such an embodiment a user can enter the user telestration input by moving a finger, stylus or other input device across the touch screen. In response to detecting this movement, the control device generates a visual representation of the user telestration input along the path of the movement. For example, the control device control device can draw a line or other shape along the path of the moment. The visual representation of the user generated shape can be used to highlight specific features of events in the selected video.

As one specific example, a user can encircle a displayed element in the video, thereby generating a visible line or other visual representation around the displayed element to highlight that element to viewers of the output video stream. However, this use of a touch screen to draw a line around a displayed element is just one example of how user telestration inputs can be entered, and other implementations are possible.

In one embodiment the process step 312 is implemented using a suitable touch screen user interface application. In such an application points of touching along the path of finger or stylus movement are determined and lines are drawn using Bezier path between the points. The lines are then rendered and displayed on the touch screen by the operating system. In some embodiments the user can select line thickness and color using an appropriate operating system module. Furthermore, the ability to erase and delete lines can be provided using an appropriate operating system module.

As one specific example, touch points on the touch screen can be sampled in process step 312 every 16 milliseconds (for 60 fps) or 33 milliseconds (for 30 fps) using Apple API touchesBegan or equivalent APIs for other platforms. The points can then be interpolated on a Bezier curve using the Apple API addCurve or equivalent APIs for other platforms.

At process step 314 a minimum capture shape is determined. At this step, the control device determines the parameters of a shape that can be used to capture an image of the visual representation of the user telestration input. Specifically, the use of the minimum capture shape reduces the processing resources needed to capture and transmit the captured image to the video access point device. A variety of different techniques can be used to determine such a minimum capture shape. Additionally, a variety of different types of shapes can be determined and used at this step. As one example, a minimum rectangle that corresponds to the user telestration input received during the previous sample cycle is calculated.

In one specific embodiment, a minimum rectangle can be calculated in process step 314 by taking the bounding rectangle of the Bezier path (e.g., UIBezierPath) using the Apple API CGPath.boundingBox or equivalent API on other platforms.

At process step 316 an image of the visual representation of the user telestration input corresponding to the minimum capture shape is captured. In a typical embodiment, this step only captures an image of the area inside minimum capture shape to reduce the processing resources needed for the capture. However, in other embodiments this step can capture a larger image and then crop the image down the minimum capture shape.

Additionally, in this process step 316 it is generally desirable to capture only the layer or layers of the image that contain the visual representation of the user telestration input. This can be done by capturing only the layers that were generated in process step 312. This again reduces the processing resources and transmission resources needed to process and transmit the image to the video access point device.

In one embodiment the image is captured by copying the image payload string directly into an image decode buffer. This can reduce the overall time needed for later decoding of the image. In other embodiments the image is captured by copying the path of the file where the image string is stored. In either case the values of image resolution, width, height, and pixel format can also be captured and stored. This allows the control device to recognize images that exceed a maximum size or resolution from and prevent those images from being decoded and overly utilizing processing resources.

In one specific embodiment an image can be captured in process step 316 using the Apple API UIGraphicsGetImageFromCurrentImageContext or equivalent API on other platforms. When implemented such an API captures a screenshot of the UIImageView layer or equivalent that contains the telestration image.

With the image of the visual representation of the user telestration input captured, that image is transmitted to the video access point device using an image transfer function 318. This transfer can be accomplished using established using wireless protocols (e.g., Wi-Fi) or wired systems (e.g., Ethernet or HDMI). Additionally, this transfer can be accomplished using a variety of procedures, including a variety of remote procedure calls. As one specific example, this image transfer can be performed using a Thrift procedure call.

At process step 320 the transferred image of the visual representation of the user telestration input is combined with any previous captured and transmitted images. In this step the image is combined with images that were captured and transferred in previous sample cycles and are part of the same user telestration input. In one embodiment previously captured and transferred images are combined into a base image, and for each sample cycle newly transmitted images are added to the new base image so that future images can be combined with the new base image.

In one specific embodiment the newly transferred image is first decoded into a raw image format. The raw image format allows the transferred image to be more easily manipulated and combined with other images. Then, in one embodiment the transferred image is combined with a base image using an image stitching function.

At process step 322 the combined image is overlaid with a selected video stream. This results in an output video stream that includes the image of the user telestration input in form that can be stored or transmitted. In one embodiment the combined image is overlaid with the selected video using a suitable blending procedure.

With the combined image of the visual representation of the user telestration input overlaid with the selected video stream, the resulting output video stream is transmitted to the network using video transmit function 324. In some embodiments the selected video stream with overlaid image are first encoded into an appropriate format. For example, the selected video with overlaid image can be encoded into an H.264 format and combined with audio as needed. The selected video stream with overlaid image and combine audio can then be remixed to a transport stream (TS) for transmitting. With this transfer the output video stream may then be stored as a file on an external storage (e.g., a memory card, hard drive or other non-volatile storage) and/or uploaded to a hosting or distribution service operating on the Internet or another network.

During operation the process flow illustrated in FIG. 3 is repeatedly performed, with process steps 312, 314, 316, 320 and 322 repeated for sample cycle. Thus, for each sample cycle a user telestration input is received, a minimum capture shapes is determined, an image corresponding to the minimum capture shape is captured and transmitted, the transmitted image is combined and overlaid with the selected video. In one example embodiment the sample rate corresponds to the frame rate of the selected video. For example, where the selected video has a frame rate of 30 frames per second, the processing steps 312, 314, 316, 320 and 322 may be performed every 33 milliseconds. However, this is just one example. In other examples the processing steps 312, 314, 316, 320 and 322 may be performed once for every 2, 4 or 8 frames. In such an embodiment the same combined image may be overlaid in successive frames.

The process flow illustrated in FIG. 3 can again provide several distinct improvements. Specifically, the use of the minimum capture shapes to capture and transmit the user telestration inputs can significant reduce the time and processing resources needed to capture the images of the user telestration input at the control device. Furthermore, the use of the minimum capture shapes 204, 208 to capture and transmit the user telestration inputs can significant reduce the time and transmission resources needed to transmit the captured images from the control device to the video access point device. This can facilitate improved performance, such as increased output video stream frame rates. Finally, it should be noted that FIG. 3 illustrates only one potential embodiment, and that other embodiments may be organized to execute in any other manner, with the various functions and messages shown in FIG. 3 being differently organized and/or executed by other devices, as appropriate.

Figure 4:
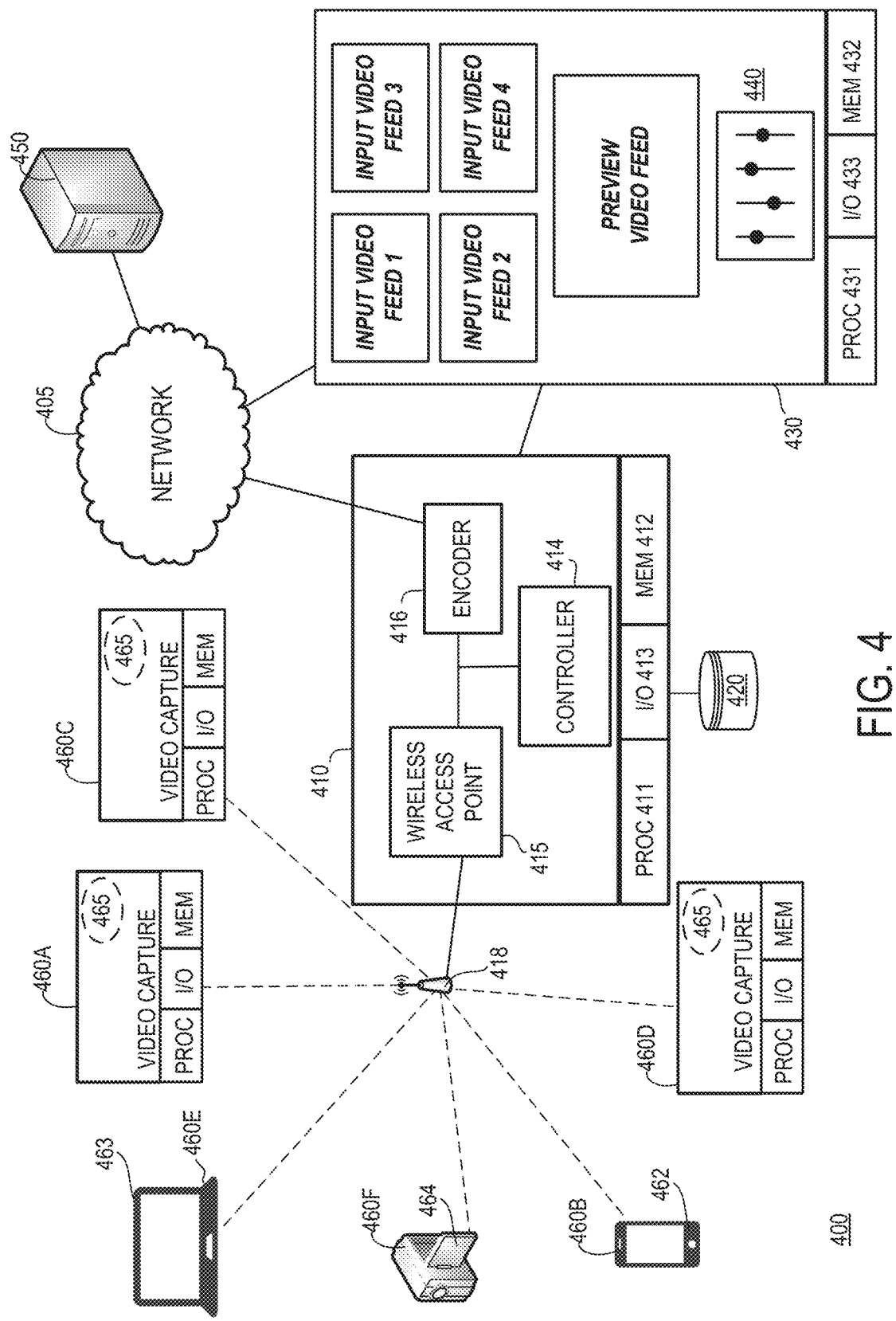
FIG. 4 is a detailed diagram of one example implementation of a video production system.

Turning now to FIG. 4, a more detailed example of a video production system 400 is illustrated. In accordance with the embodiments described herein, the video production system 400 is implemented to facilitate the incorporation of remotely generated user telestration inputs into output video streams. Specifically, the video production system 400 is implemented to receive user telestration inputs from a user, determine minimum capture shapes corresponding to the user telestration inputs, capture images of the user telestration input corresponding to the minimum capture shape, and transmit those images.

The video production system 400 can be used to produce a video program based upon selected videos from multiple input video feeds. To facilitate this, the video production system 400 includes a video access point device 410 and a control device 430. In the illustrated example, the video access point device 410 provides a wireless access point and appropriate encoding hardware to encode video programming based upon instructions received from the control device 430. The encoded video program may be initially stored as a file on an external storage 420 (e.g., a memory card, hard drive or other non-volatile storage) for eventual uploading to a distribution or hosting service 450 operating on the Internet or another network 405. Such distribution or hosting services 450 could include, for example, YouTube, Facebook, Ustream, Twitch, Mixer and/or the like.

The video access point device 410 suitably includes processing hardware such as a microprocessor 411, memory 412 and input/output interfaces 413 (including a suitable USB or other interface to the external storage 420). The example illustrated in FIG. 4 shows video access point device 410 also including a wireless access point 415, where the wireless access point 415 includes processing logic to implement an IEEE 802.11, 802.14 or other wireless protocol for communicating with any number of video capture devices 460A-F though an antenna 418. These video capture devices 460A-F can suitably include a variety of different types of devices, including mobile phones 462, tablets, laptops 463 or similar devices executing a video capture application 465, as desired. Video capture devices 460A-F could also include one or more conventional video cameras 464 that interact with video access point device 410 via an interface device that receives DVI or other video inputs and transmits the received video to the video access point device 410 via Wi-Fi, Bluetooth or other wireless network, as appropriate. Other embodiments could facilitate communications with any other types of video capture devices in any other suitable manner.

Video access point device 410 also suitably includes a controller 414 and encoder 416. Controller 414 and/or encoder 416 may be implemented as software logic stored in memory 412 and executing on processor 411 in some embodiments. Specifically, controller 414 may be implemented as a control application executing on processor 411, for example. In accordance with the embodiments described herein, this control application can include logic for implementing the combing of received images of user telestration inputs with previously received images, and the overlaying of combined images with a selected video stream. Other embodiments may implement the various functions and features using hardware, software and/or firmware logic executing on other components, as desired. Encoder 416, for example, may be implemented using a dedicated video encoder chip in some embodiments. It should also be noted that in equivalent embodiments the encoding and access point functions of video access point device 410 may be provided in two separate devices with separate chassis and hardware, as desired.

In various embodiments, video access point device 410 operates in response to user inputs supplied by the control device 430. Control device 430 can be implemented with any sort of computing device that includes a processor 431, memory 432 and input/output interfaces 433. Various embodiments could implement control device 430 as a tablet computer, mobile phone, laptop computer or other computing system. In each case the control device 430 may be implemented as a device that executes one or more applications for controlling the functions of video production system 400.

In a typical implementation control device 430 is configured to interact with video access point device 410 directly using a wireless protocol (e.g., Wi-Fi) although a connection through any other network (e.g., network 405) could equivalently be used. Other embodiments may use any other network configuration desired, including any number of additional or alternate networks or other data links.

The example illustrated in FIG. 4 shows an interface 440 for a control application. The interface 440 displays a plurality of input video feeds received from some or all of the video capture devices 460A-F. Furthermore, the interface 440 allows a user to select one or more of the input video feeds to encode into the output video feed. The interface 440 also includes a preview window to display a preview video feed. Interface 440 may include other displays to control other behaviors or features of video production system 400, as desired. In the illustrated example interface 440, including the input video feed windows and preview windows are all displayed on one display, albeit in separate portions of the display. In practice, however, the various elements of interface 440 may equivalently be presented on multiple separate screens for larger presentation or ease of viewing. Interface 440 could be equivalently presented in a dashboard or similar view that presents system or device status information, as desired. Again, the presentation and appearance of the interface 440 may be very different in other embodiments, and may incorporate any different types of information or content arranged in any manner.

In operation, then, a user acting as a video producer or other user would use interface 440 to view the various video feeds that are available from one or more video capture devices 460A-F as provided by video access point device 410. One or more selected video feeds received from the video access point device are displayed in the preview window. The video access point device 410 suitably compresses or otherwise encodes the selected video in an appropriate format for eventual viewing or distribution, e.g., via an Internet or other hosting service 450.

In one embodiment the interface 440 is implemented with a touch screen. In such an embodiment the touch screen can display both the video feeds (e.g., input video feeds and preview video feed) and receive the user telestration input. In such an embodiment a user can enter the user telestration input by moving a finger, stylus or other input device across the interface 440. In response to detecting this movement, the control device 430 generates a visual representation of the user telestration input on the interface 440. Specifically, the visual representation of the user telestration input can be generated along the path of the movement to create a desired visual effect. For example, the control device control device can draw a line or other shape along the path of the moment. The visual representation of the user generated shape can be used to highlight specific features of events in the selected video.

In accordance with the embodiments described herein, the control device 430 and video access point device 410 are implemented to facilitate the incorporation of these user telestration inputs into output video feeds generated by the video access point device 410. In such an embodiment the control device 430 then determines a minimum capture shape corresponding to the received user telestration input, and captures an image of the visual representation of the user telestration input corresponding to the minimum capture shape. The control device 430 then transmits the captured image of the user telestration input to the video access point device 410.

At the video access point device 410 the captured images can then be combined with previously captured images of previous user telestration inputs. The video access point device 410 then overlays the combined images with a selected video feed. The video fed with the overlaid image can then be stored or outputted by the video access point device 410 as an output video stream.

In such an embodiment the use of the minimum capture shapes to capture and transmit the user telestration inputs can provide several distinct improvements. Specifically, the use of the minimum capture shapes to capture and transmit the user telestration inputs can significant reduce the time and processing resources needed to capture the user telestration input at the control device 430. Furthermore, the use of the minimum capture shapes to capture and transmit the user telestration inputs can significant reduce the time and transmission resources needed to transmit the captured images from the control device 430 to the video access point device 410. This can facilitate improved performance, such as increased output video stream frame rates.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a control device and a video access point device, the automated process comprising:
   receiving a first user telestration input for a selected input video stream at the control device;
   determining a first minimum capture shape corresponding to and surrounding the first user telestration input;
   capturing at the control device a first image corresponding to the first minimum capture shape, the captured first image including a representation of the user telestration input within the first minimum capture shape and a portion of the selected input video stream within the first minimum capture shape, but not including portions of the selected input video stream outside the first minimum capture shape;
   transmitting the captured first image from the control device to the video access point device;
   overlaying the captured first image with the selected input video stream at the video access point device; and
   transmitting the selected input video stream with the captured first image from the video access point device as an output video stream for viewing.

2. The automated process of claim 1 wherein the step of determining the first minimum capture shape corresponding to and surrounding the first user telestration input comprises determining user telestration input occurring during a first sample cycle.

3. The automated process of claim 2 wherein the step of overlaying the captured first image with the selected input video stream at the video access point device comprises combining the captured first image with a previously captured image and overlaying the combined image with the selected input video stream.

4. The automated process of claim 1 wherein the representation of the user telestration input is included in a first image layer, and wherein the captured first image includes image data from the first image layer.

5. The automated process of claim 1 wherein the first minimum capture shape is a rectangle.

6. The automated process of claim 1 wherein the control device comprises a touch screen and wherein the user telestration input is received using the touch screen.

7. The automated process of claim 1 wherein the step of transmitting the captured first image from the control device to the video access point device is done using a remote procedure call.

8. The automated process of claim 1 further comprising:
   receiving a second user telestration input for the selected input video stream at the control device;
   determining a second minimum capture shape corresponding to and surrounding the second user telestration input;
   capturing at the control device a second image corresponding to the second minimum capture shape, the captured second image including a representation of the second user telestration input within the second minimum capture shape and a portion of the selected input video stream within the second minimum capture shape, but not including portions of the selected input video stream outside the second minimum capture shape;
   transmitting the captured second image from the control device to the video access point device;
   combining the captured second image and the captured first image to generate a combined image;
   overlaying the combined image with the selected input video stream at the video access point device; and
   transmitting the selected input video stream overlaid with the combined image from the video access point device as an output for viewing.

9. The automated process of claim 8 wherein the step of determining the first minimum capture shape corresponding to and surrounding the first user telestration input comprises determining user telestration input occurring during a first sample cycle and wherein the step of determining the second minimum capture shape corresponding to and surrounding the second user telestration input comprises determining user telestration input occurring during a second sample cycle following the first sample cycle.

10. The automated process of claim 1 wherein the control device comprises a processor, memory and display, wherein the processor executes program logic stored in the memory to perform the steps of determining the first minimum capture shape corresponding to and surrounding the user telestration input and capturing at the control device the first image corresponding to the first minimum capture shape.

11. A control device comprising a processor and a memory, wherein the processor is configured to perform an automated process by executing digital instructions stored in the memory, wherein the automated process comprises:
   receiving a first user telestration input for a selected input video stream at the control device;
   determining a first minimum capture shape corresponding to and surrounding the first user telestration input;
   capturing at the control device a first image corresponding to the first minimum capture shape, the captured first image including a representation of the user telestration input within the first minimum capture shape and a portion of the selected input video stream within the first minimum capture shape, but not including portions of the selected input video stream outside the first minimum capture shape; and
   transmitting the captured first image from the control device to a video access point device to be overlaid with the selected input video stream at the video access point device.

12. The control device of claim 11 wherein the determining the first minimum capture shape corresponding to and surrounding the first user telestration input comprises determining user telestration input occurring during a first sample cycle.

13. The control device of claim 12 wherein the overlaying the captured first image with the selected input video stream at the video access point device comprises combining the captured first image with a previously captured image and overlaying the combined image with the selected input video stream.

14. The control device of claim 11 wherein the representation of the user telestration input is included in a first image layer, and wherein the captured first image includes image data from the first image layer.

15. The control device of claim 11 wherein the first minimum capture shape is a rectangle.

16. The control device of claim 11 wherein the control device comprises a touch screen and wherein the user telestration input is received using the touch screen.

17. The control device of claim 11 wherein the transmitting the captured first image from the control device to the video access point device is done using a remote procedure call.

18. The control device of claim 11 wherein the automated process further comprises:

receiving a second user telestration input for the selected input video stream at the control device;

determining a second minimum capture shape corresponding to and surrounding the second user telestration input;

capturing at the control device a second image corresponding to the second minimum capture shape, the captured second image including a representation of the second user telestration input within the second minimum capture shape and a portion of the selected input video stream within the second minimum capture shape, but not including portions of the selected input video stream outside the first minimum capture shape; and transmitting the second image from the control device to the video access point device to be combined with the transmitted first image and overlaid with the selected input video stream at the video access point device.

19. The control device of claim 18 wherein the determining the first minimum capture shape corresponding to and surrounding the first user telestration input comprises determining user telestration input occurring during a first sample cycle and wherein the step of determining the second minimum capture shape corresponding to and surrounding the second user telestration input comprises determining user telestration input occurring during a second sample cycle following the first sample cycle.

20. An automated process executable by a control device and a video access point device, where the control device includes a touch screen, a processor and a memory, and where the video access point includes a wireless access point and an encoder, the automated process comprising:

transmitting a plurality of input video streams from the access point device to the control device using the wireless access point;

displaying a selected input video stream from the plurality of input video streams on the touch screen at the control device;

receiving a user telestration input for the selected input video stream on the touch screen at the control device during a sample cycle;

displaying a visual representation of the user telestration input on the touch screen;

determining a minimum capture rectangle corresponding to and surrounding the visual representation of the user telestration input during the sample cycle at the control device;

capturing at the control device an image layer corresponding to the minimum capture rectangle at the control device, the captured image layer including the visual representation of the user telestration input within the minimum capture rectangle and a portion of the input video stream within the minimum capture rectangle, but not including portions of the selected input video stream outside the minimum capture rectangle;

transmitting the visual representation of the user telestration input within the minimum capture rectangle from the control device to the video access point device;

combining the transmitted visual representation of the user telestration input within the minimum capture rectangle with at least one previously transmitted visual representation of a previous user telestration input, the at least one previously transmitted visual representation of a previous user telestration input captured during a previous sample cycle;

overlaying the combined visual representations of the user telestration inputs with the selected input video stream at the video access point device;

encoding the selected input video stream overlaid with the combined visual representations of the user telestration inputs using the encoder to generate an output video stream; and transmitting the output video stream to a hosting service for viewing using the hosting service.

* * * * *